United States Patent
Shen et al.

(10) Patent No.: US 8,331,215 B2
(45) Date of Patent: Dec. 11, 2012

(54) CONCURRENT TRANSMISSION OF MULTIPLE ACKNOWLEDGE/NOT ACKNOWLEDGE AND SCHEDULING REQUEST INDICATOR IN TIME DIVISION DUPLEX UPLINK SIGNALING

(75) Inventors: Zukang Shen, Richardson, TX (US); Tarik Muharemovic, Dallas, TX (US); Timothy Schmidl, Dallas, TX (US)

(73) Assignee: Texas Instruements Incorporated, Dallas, TX (US)

( * ) Notice: Subject to any disclaimer, the term of this patent is extended or adjusted under 35 U.S.C. 154(b) by 326 days.

(21) Appl. No.: 12/502,493

(22) Filed: Jul. 14, 2009

(65) Prior Publication Data

US 2010/0329194 A1 Dec. 30, 2010

Related U.S. Application Data

(60) Provisional application No. 61/080,401, filed on Jul. 14, 2008.

(51) Int. Cl.
*H04J 11/00* (2006.01)

(52) U.S. Cl. ......................................... 370/206; 370/328
(58) Field of Classification Search .................. 370/206, 370/207, 431
See application file for complete search history.

(56) References Cited

U.S. PATENT DOCUMENTS

| | | | |
|---|---|---|---|
| 2008/0316959 A1* | 12/2008 | Bachl et al. | 370/329 |
| 2009/0196204 A1* | 8/2009 | Astely et al. | 370/280 |
| 2009/0221289 A1* | 9/2009 | Xu et al. | 455/435.1 |
| 2009/0303978 A1* | 12/2009 | Pajukoski et al. | 370/345 |
| 2010/0208709 A1* | 8/2010 | Kim et al. | 370/336 |
| 2010/0260057 A1* | 10/2010 | Lee et al. | 370/252 |
| 2010/0325508 A1* | 12/2010 | Hu et al. | 714/749 |

* cited by examiner

*Primary Examiner* — Jung Park
(74) *Attorney, Agent, or Firm* — Ronald O. Neerings; Wade James Brady, III; Frederick J. Telecky, Jr.

(57) ABSTRACT

This invention is a transmission scheme for multi-ACK/NAK and SRI in TDD. The described scheme enables using DAI as pure counter. QPSK is adopted as the modulation scheme in this invention which guarantees satisfactory detection performance. Link level simulations show that the event of one DL grant pass followed by three consecutive DL grant misses is of low probability.

9 Claims, 3 Drawing Sheets

CONCURRENT TRANSMISSION OF MULTIPLE ACKNOWLEDGE/NOT ACKNOWLEDGE AND SCHEDULING REQUEST INDICATOR IN TIME DIVISION DUPLEX UPLINK SIGNALING

CLAIM OF PRIORITY

This application claims priority under 35 U.S.C. 119(e) (1) to U.S. Provisional Application No. 61/080,401 filed Jul. 14, 2008.

TECHNICAL FIELD OF THE INVENTION

The technical field of this invention is mobile telephones.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of uplink 111 time or frequency or code resources. If UE 109 has data ready for transmission, which may be traffic data, measurements report, tracking area update, UE 109 can transmit a random access signal on uplink 111. The random access signal notifies base station 101 that UE 109 requires uplink resources to transmit the UEs data. Base station 101 responds by transmitting to UE 109 via downlink 110, a message containing the parameters of the resources allocated for UE 109 uplink transmission along with a possible timing error correction. After receiving the resource allocation and a possible timing advance message transmitted on downlink 110 by base station 101, UE 109 optionally adjusts its transmit timing and transmits the data on uplink 111 employing the allotted resources during the prescribed time interval.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Config-uration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

The possibility of assigning multiple DL subframe transmissions for response in only a single UP subframe creates a coding problem.

SUMMARY OF THE INVENTION

This invention is a transmission scheme for multi-ACK/NAK and SRI in TDD. The described scheme enables using DAI as pure counter. QPSK is adopted as the modulation scheme in this invention which guarantees satisfactory detection performance. Link level simulations show that the event of one DL grant pass followed by three consecutive DL grant misses is of low probability.

BRIEF DESCRIPTION OF THE DRAWINGS

These and other aspects of this invention are illustrated in the drawings, in which.

DETAILED DESCRIPTION OF PREFERRED EMBODIMENTS

The 3GPP wireless telephone standard includes concurrent transmission of various uplink (UL) control signaling in frequency division duplex (FDD) signaling. Time division duplex (TDD) signaling uses different downlink (DL) and UL subframe configurations enabling two possible acknowledge/not acknowledge (ACK/NAK) transmission schemes. This first transmission scheme is pure ACK/NAK bundling where plural ACK/NAK signals are ANDed into a single bit. The second transmission scheme is multi-bit ACK/NAK transmission where plural ACK/NAK signals are encoded into plural bits. This invention concerns concurrent transmissions of multi-bit ACK/NAK and scheduling request indicator (SRI) in TDD.

As previously shown in Table 1 depending on the TDD DL/UL configuration, there may be 1, 2, 3, 4 or 9 DL subframes associated with one UL subframe. For a UL subframe associated with only one DL subframe, the ACK/NAK and SRI transmission scheme can follow the same principle as in FDD. Thus the 1 or 2 ACK/NAK bits are transmitted on the SRI channel if SRI is positive and transmitted on the ACK/NAK channel if SRI is negative.

For a UL subframe associated with multiple DL subframes, the scheme of multi-bit ACK/NAK and SRI can be: if the SRI is negative transmit multiple ACK/NAK bits; and if the SRI is positive, bundle the ACK/NAK bits into 1 or 2 bundled ACK/NAK bits and transmit the bundled ACK/NAK bits on the SRI channel.

A 2-bit downlink assignment index (DAI) exists for each dynamically scheduled DL subframe. Thus the UE can utilize the DAI to detect a possible DL grant miss. In case of ACK/NAK bundling without concurrent channel quality indicator (CQI) or SRI, upon the detection of a DL grant miss, the UE will transmit discontinuous transmission (DTX). On the other hand, for concurrent transmission of bundled ACK/NAK and SRI, the UE will transmit a NAK on the detection of any DL grant miss. According to the logical AND operation across all ACK/NAK bits bundling rule, for a UL subframe associated with more than one DL subframe, the following possible states exist, i.e. {NAK, $ACK_1$, $ACK_2$, ..., $ACK_N$}, where $ACK_i$ denotes that the UE received the i-th packet correctly.

Figure 1:
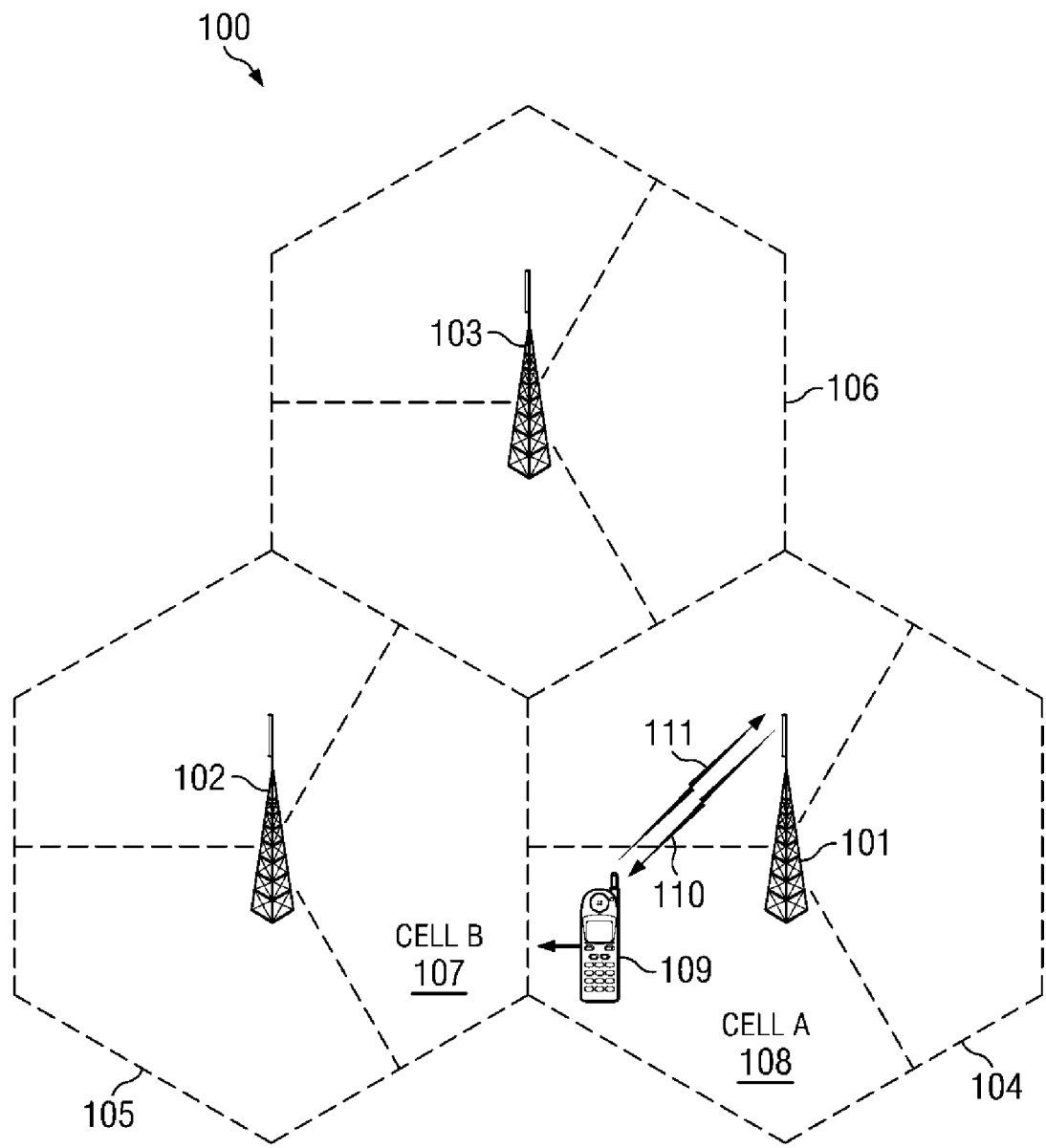
FIG. 1 is a diagram of a communication system of the prior art related to this invention having three cells.
Figure 2:
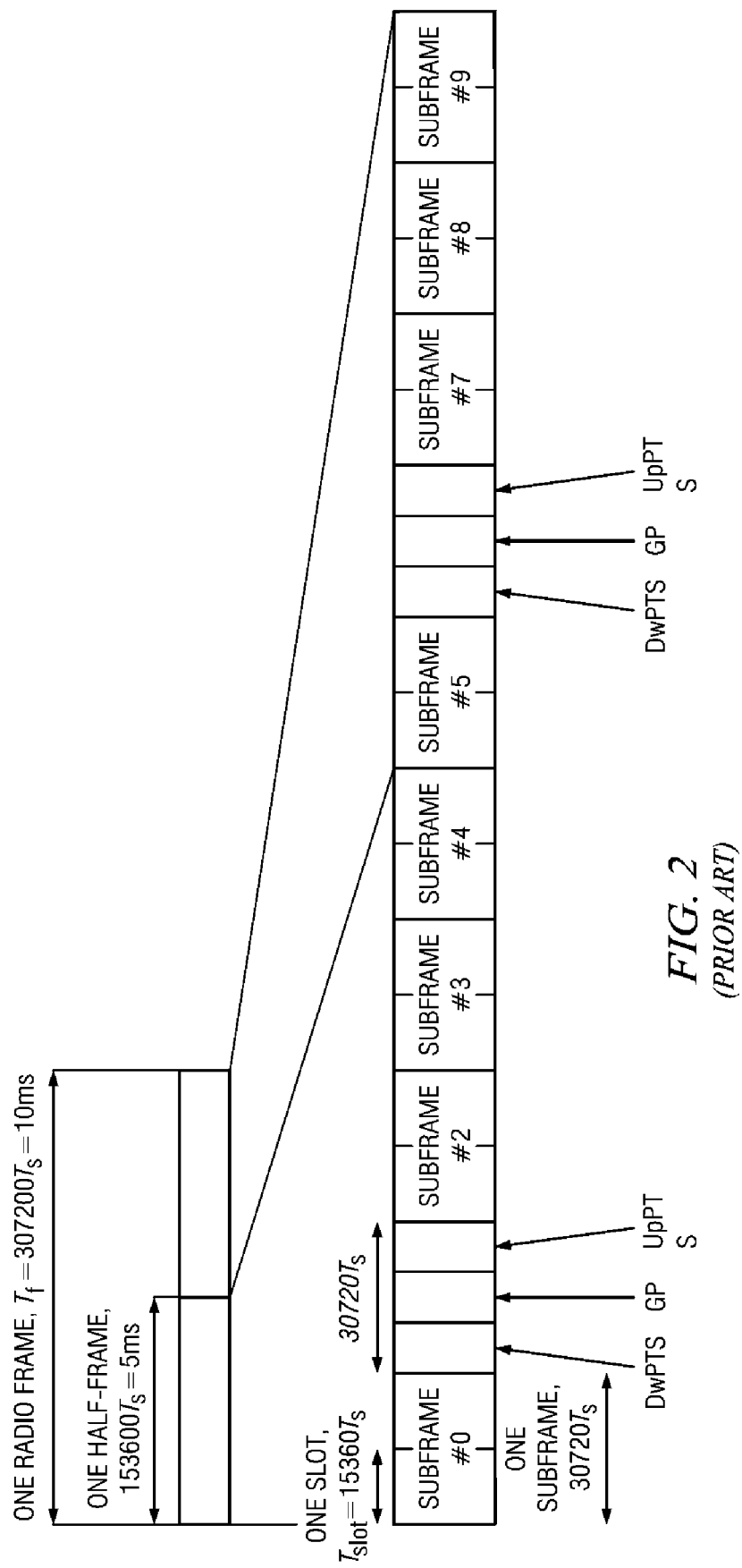
FIG. 2 shows the Evolved Universal Terrestrial Radio Access (E-UTRA) TDD Frame Structure of the prior art.
Figure 3:
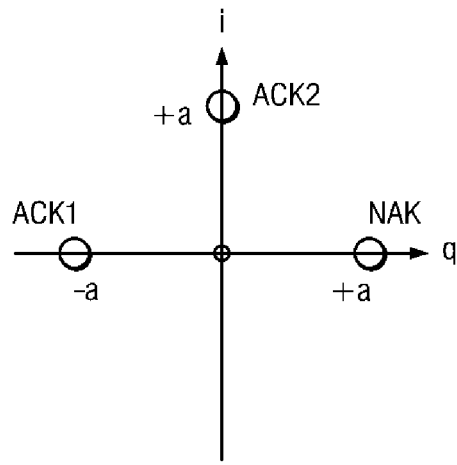
FIG. 3 illustrates a quadrature phase shift keying (QPSK) mapping scheme for bundled ACK/NAK bits if number of ACK signals is 2.

FIG. 3 illustrates the QPSK mapping scheme of this invention to convey the bundled ACK/NAK bits on the SRI channel, if SRI is positive and the number of ACK signals N is 2. The QPSK signal is +a on the real axis if the bundled ACK/NAK bits represent one or two NAKs. The QPSK signal is −a on the real axis if the bundled ACK/NAK bits represent $ACK_1$. The QPSK signal is +a on the imaginary axis if the bundled ACK/NAK bits represent $ACK_2$.

Figure 4:
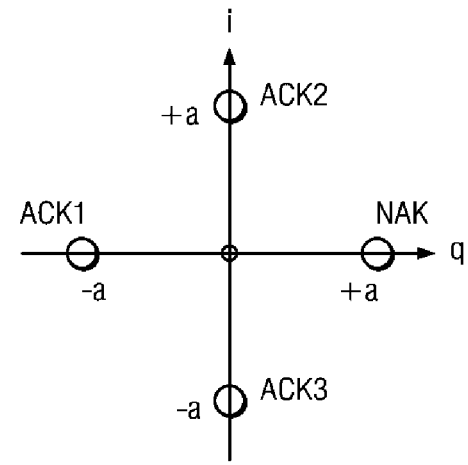
FIG. 4 illustrates a QPSK mapping scheme for bundled ACK/NAK bits if number of ACK signals is 3.

FIG. 4 illustrates the QPSK mapping scheme of this invention to convey the bundled ACK/NAK bits on the SRI channel, if SRI is positive and the number of ACK signals N is 3. The QPSK signal is +a on the real axis if the bundled ACK/NAK bits represent one, two or three NAKs. The QPSK signal is −a on the real axis if the bundled ACK/NAK bits represent $ACK_1$. The QPSK signal is +a on the imaginary axis if the bundled ACK/NAK bits represent $ACK_2$. The QPSK signal is −a on the imaginary axis if the bundled ACK/NAK bits represent $ACK_3$.

Figure 5:
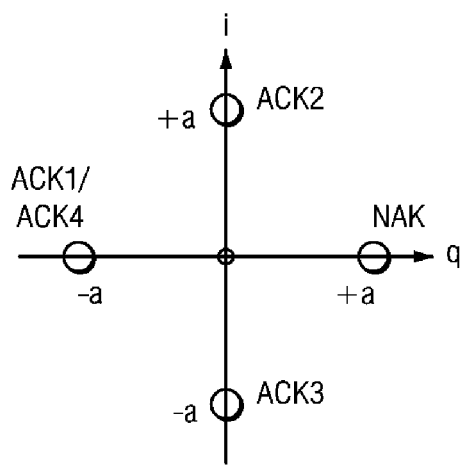
FIG. 5 illustrates a QPSK mapping scheme for bundled ACK/NAK bits if number of ACK signals is 4.

FIG. 5 illustrates the QPSK mapping scheme of this invention to convey the bundled ACK/NAK bits on the SRI channel, if SRI is positive and the number of ACK signals N is 4. The QPSK signal is +a on the real axis if the bundled ACK/NAK bits represent one, two, three or four NAKs. The QPSK signal is −a on the real axis if the bundled ACK/NAK bits represent the ANDed pair $ACK_1$ and $ACK_4$. The QPSK signal is +a on the imaginary axis if the bundled ACK/NAK bits represent $ACK_2$. The QPSK signal is −a on the imaginary axis if the bundled ACK/NAK bits represent $ACK_3$.

Figure 6:
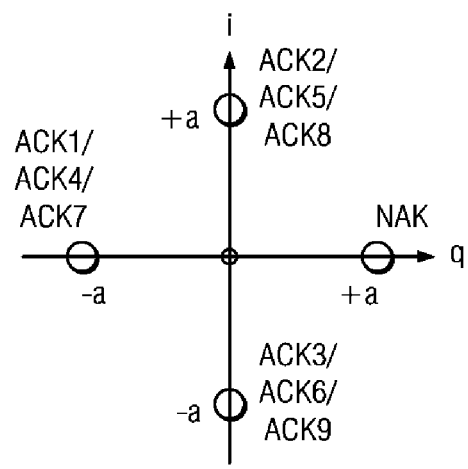
FIG. 6 illustrates a QPSK mapping scheme for bundled ACK/NAK bits if number of ACK signals is 9.

FIG. 6 illustrates the QPSK mapping scheme of this invention to convey the bundled ACK/NAK bits on the SRI channel, if SRI is positive and the number of ACK signals N is 4. The QPSK signal is +a on the real axis if the bundled ACK/NAK bits represent one, two, three, four or nine NAKs. The QPSK signal is −a on the real axis if the bundled ACK/NAK bits represent the ANDed triple $ACK_1$, $ACK_4$ and $ACK_7$. The QPSK signal is +a on the imaginary axis if the bundled ACK/NAK bits represent the ANDed triple $ACK_2$, $ACK_5$ and $ACK_8$. The QPSK signal is −a on the imaginary axis if the bundled ACK/NAK bits represent the ANDed triple $ACK_3$, $ACK_6$ and $ACK_9$.

Note in FIG. 5 for N=4 and FIG. 6 for N=9 there are multiple states sharing the same QPSK symbol. Higher order modulation may be adopted so that each state corresponds to a unique QAM symbol. This is not preferred because detection performance degrades significantly for higher order modulation.

The existence of multiple states sharing the same QPSK symbol creates irreducible error floors. For instance, if a UE is scheduled in 4 DL subframes, NodeB cannot distinguish the following two events: the UE decodes the first physical downlink shared channel (PDSCH) or the first physical downlink control channel (PDCCH) correctly, while missing the last 3 DL grants; and the UE decodes all four PDSCH correctly. The error floor is the probability of the UE correctly receiving the first DL grant while missing the next three DL grants. Table 2 shows that for the required signal to noise ratio (SNR) and the probability of one DL grant pass followed by three DL grant misses for two sample PDCCH BLER rates.

TABLE 2

| PDCCH BLER | Required SNR (dB) | Probability of one DL grant pass followed by three DL grant misses |
|---|---|---|
| 1% | −3 dB | 0.04% |
| 5% | −4 dB | 0.4% |

As noted in Table 2 for an average DL grant detection BLER of 1%, the probability of one DL grant pass followed by three DL grant misses is less than 0.1%. In addition, the error event can only occur if a UE has a positive SRI while being scheduled in more than 4 DL subframes. Therefore, the overall error probability due to mixing the events noted above is negligible. Table 3 shows other simulation parameters.

TABLE 3

| DCI format | Format 1 |
|---|---|
| Number of Tx Antennas | 1 |
| Number of Rx Antennas | 2, uncorrelated |
| UE Speed | 3 km/h |
| Channel Model | ETU |
| PDCCH CCE Aggregation Level | 8 |

This invention is a transmission scheme for multi-ACK/NAK and SRI in TDD. The described scheme enables using DAI as pure counter. QPSK is adopted as the modulation scheme in this invention which guarantees satisfactory detection performance. Link level simulations show that the event of one DL grant pass followed by three consecutive DL grant misses is of low probability.

What is claimed is:

1. A method of responding in a wireless user equipment (UE) with an acknowledge (ACK) or non-acknowledge (NAK) to a downlink (DL) communication from a base station using frames where at least one uplink (UL) is assigned a subframe to respond to a plurality of DL assigned subframes, comprising the steps of:

generating an ACK response at the UE to each DL communication correctly received;

generating a NAK response at the UE to each DL communication not correctly received;

for a UL subframe assigned to respond to communications on plural DL subframes logically combining plural ACK/NAK responses into a first response state if any of said ACK/NAK responses is a NAK and a corresponding one of a plurality of second response states if all said plural ACK/NAK responses are ACKs; and transmitting ACK/NAK responses from the UE to the base station in an uplink communication including transmitting a first ACK/NAK signal if said logically combined plural ACK/NAK responses have said first response state and transmitting a corresponding one of a plurality of second ACK/NAK signals if said logically combined plural ACK/NAK responses have one of said second response states.

2. The method of claim 1, wherein:

said number of said plurality of DL assigned subframes is 2;

said uplink communication includes a scheduling request indicator (SRI);

said method further includes if SRI is negative separately transmitting said plural ACK/NAK responses;

if SRI is positive said step of transmitting said first ACK/NAK signal transmits a first predetermined quadrature phase shift keying (QPSK) signal; and if SRI is positive said step of transmitting said corresponding one of said plurality of second ACK/NAK signals transmits a corresponding second predetermined QPSK signal.

3. The method of claim 2, wherein:

said corresponding second predetermined second QPSK signal is −a on the real axis if the bundled ACK/NAK bits represent ACK of the DL of a first subframe; and said corresponding second predetermined second QPSK signal is +a on the imaginary axis if the bundled ACK/NAK bits represent ACK of the DL of a second subframe.

4. The method of claim 1, wherein:

said number of said plurality of DL assigned subframes is 3;

said uplink communication includes a scheduling request indicator (SRI);

said method further includes if SRI is negative separately transmitting said plural ACK/NAK responses;

if SRI is positive said step of transmitting said first ACK/NAK signal transmits a first predetermined quadrature phase shift keying (QPSK) signal; and if SRI is positive said step of transmitting said corresponding one of said plurality of second ACK/NAK signals transmits a corresponding second predetermined QPSK signal.

5. The method of claim 4, wherein:

said corresponding second predetermined second QPSK signal is −a on the real axis if the bundled ACK/NAK bits represent ACK of the DL of a first subframe;

said corresponding second predetermined second QPSK signal is +a on the imaginary axis if the bundled ACK/NAK bits represent ACK of the DL of a second subframe; and said corresponding second predetermined second QPSK signal is −a on the imaginary axis if the bundled ACK/NAK bits represent ACK of the DL of a third subframe.

6. The method of claim 1, wherein:

said number of said plurality of DL assigned subframes is 4;

said uplink communication includes a scheduling request indicator (SRI);

said method further includes if SRI is negative separately transmitting said plural ACK/NAK responses;

if SRI is positive said step of transmitting said first ACK/NAK signal transmits a first predetermined quadrature phase shift keying (QPSK) signal; and if SRI is positive said step of transmitting said corresponding one of said plurality of second ACK/NAK signals transmits a corresponding second predetermined QPSK signal.

7. The method of claim 6, wherein:

said corresponding second predetermined second QPSK signal is −a on the real axis if the bundled ACK/NAK bits represent ACK of the DL of a first subframe or ACK of the DL of a fourth subframe;

said corresponding second predetermined second QPSK signal is +a on the imaginary axis if the bundled ACK/NAK bits represent ACK of the DL of a second subframe; and said corresponding second predetermined second QPSK signal is −a on the imaginary axis if the bundled ACK/NAK bits represent ACK of the DL of a third subframe.

8. The method of claim 1, wherein:

said number of said plurality of DL assigned subframes is 9;

said uplink communication includes a scheduling request indicator (SRI);

said method further includes if SRI is negative separately transmitting said plural ACK/NAK responses;

if SRI is positive said step of transmitting said first ACK/NAK signal transmits a first predetermined quadrature phase shift keying (QPSK) signal; and if SRI is positive said step of transmitting said corresponding one of said plurality of second ACK/NAK signals transmits a corresponding second predetermined QPSK signal.

9. The method of claim 8, wherein:

said corresponding second predetermined second QPSK signal is −a on the real axis if the bundled ACK/NAK bits represent ACK of the DL of a first subframe, ACK of the DL of a fourth subframe or ACK of the DL of a seventh subframe;

said corresponding second predetermined second QPSK signal is +a on the imaginary axis if the bundled ACK/NAK bits represent ACK of the DL of a second subframe, ACK of the DL of a fifth subframe or ACK of the DL of an eighth subframe; and said corresponding second predetermined second QPSK signal is −a on the imaginary axis if the bundled ACK/NAK bits represent ACK of the DL of a third subframe, ACK of the DL of a sixth subframe or ACK of a DL of a ninth subframe.

\* \* \* \* \*